United States Patent
Ko et al.

(10) Patent No.: US 9,905,048 B2
(45) Date of Patent: Feb. 27, 2018

(54) SYSTEM FOR AUTHORING AND PROVIDING AUGMENTED REALITY CONTENTS

(71) Applicant: KOREA INSTITUTE OF SCIENCE AND TECHNOLOGY, Seoul (KR)

(72) Inventors: Heedong Ko, Seoul (KR); Sang-chul Ahn, Seoul (KR); Byounghyun Yoo, Seoul (KR)

(73) Assignee: Korea Institute of Science and Technology, Seoul (KR)

(*) Notice: Subject to any disclaimer, the term of this patent is extended or adjusted under 35 U.S.C. 154(b) by 62 days.

(21) Appl. No.: 14/140,255

(22) Filed: Dec. 24, 2013

(65) Prior Publication Data
US 2015/0091942 A1 Apr. 2, 2015

(30) Foreign Application Priority Data
Sep. 27, 2013 (KR) ........................ 10-2013-0115640

(51) Int. Cl.
| | |
|---|---|
| G06T 19/00 | (2011.01) |
| G06F 17/30 | (2006.01) |
| G06F 3/01 | (2006.01) |

(52) U.S. Cl.
CPC ............ *G06T 19/006* (2013.01); *G06F 3/011* (2013.01); *G06F 17/3087* (2013.01); *G06T 2200/04* (2013.01); *G06T 2219/2004* (2013.01)

(58) Field of Classification Search
CPC G06T 19/006; G06F 3/04815; G06F 17/3087
See application file for complete search history.

(56) References Cited

U.S. PATENT DOCUMENTS

| | | | |
|---|---|---|---|
| 8,489,115 B2 | 7/2013 | Rodriguez et al. | |
| 2009/0254842 A1* | 10/2009 | Leacock | H04L 12/1827 715/757 |
| 2011/0279453 A1* | 11/2011 | Murphy | G06T 13/00 345/420 |

(Continued)

FOREIGN PATENT DOCUMENTS

| | | |
|---|---|---|
| KR | 10-2010-0081725 A | 7/2010 |
| KR | 10-2011-0062870 A | 6/2011 |

(Continued)

OTHER PUBLICATIONS

Extended European Search Report dated Feb. 6, 2015 in counterpart European Application No. 13199426.1-1952, (8 pages in English).

*Primary Examiner* — Yuehan Wang
(74) *Attorney, Agent, or Firm* — NSIP Law (57) ABSTRACT

Disclosed is a system for authoring and providing augmented reality contents, which includes a database storing a plurality of place models expressing an inherent physical place, a positioning unit for determining a current position of a user, a place model processing unit for searching and loading a place model corresponding to the current position of the user from the database, and a virtual object processing unit for disposing a virtual object expressed through a HTML document at a predetermined location in the loaded place model, wherein the plurality of place models is hierarchically stored so that at least one place model has at least one another place model of a subordinate concept.

17 Claims, 8 Drawing Sheets

(56) References Cited

U.S. PATENT DOCUMENTS

| | | | |
|---|---|---|---|
| 2013/0120368 A1 | 5/2013 | Miller et al. | |
| 2014/0228118 A1* | 8/2014 | Hardy | G06T 19/006 463/31 |
| 2014/0253687 A1* | 9/2014 | Lee | G06F 3/0488 348/46 |

FOREIGN PATENT DOCUMENTS

| | | |
|---|---|---|
| KR | 10-1126449 B1 | 3/2012 |
| KR | 10-2012-0052772 A | 5/2012 |
| KR | 10-2013-0061538 A | 6/2013 |
| WO | WO2009/000028 A1 | 12/2008 |

* cited by examiner

SYSTEM FOR AUTHORING AND PROVIDING AUGMENTED REALITY CONTENTS

CROSS-REFERENCE TO RELATED APPLICATION

This application claims priority to Korean Patent Application No. 10-2013-0115640, filed on Sep. 27, 2013, and all the benefits accruing therefrom under 35 U.S.C. § 119, the contents of which in its entirety are herein incorporated by reference.

BACKGROUND

1. Field

The present disclosure relates to a system for authoring and providing augmented reality contents, and more particularly, to a system for authoring and providing augmented reality contents, which allows an augmented reality content author to use place models classified hierarchically and author a content based on a layout of each place model and also allows a user to be selectively provided with only contents corresponding to the place model.

2. Description of the Related Art

An augmented reality (AR) technique overlaps a real world where a user exists with a virtual object prepared by computer graphic and provides the result to the user.

In the existing technique, in order to author augmented reality contents by means of the augmented reality technique, a content authored by using a 3D modeling tool is loaded on an authoring system, and its location, direction, size and animation are edited to augment the loaded content. However, the real world changes in real time, and numerous physical objects (which are distinguished from virtual objects displayed on a display as points of interest (POI)) exist in the real world. Therefore, in order to build and update a database (DB) by using physical objects in the real world to author augmented reality contents, a lot of costs and time is consumed.

In addition, an existing HTML document sets and visualizes a layout of its contents on a page, which is a plane. For this, contents are generally defined in a physical place with latitude/longitude coordinates based on the WGS84 earth ellipsoid. However, applying this location model in an indoor environment has practical problems since a position device is absent and markings lack immediacy. In addition, an author of existing augmented reality contents determines a place range where contents are to be disposed and a range of contents to be provided to a user within the specific place range on the basis of the kind of contents or a distance from the user. Therefore, it is impossible to augment only necessary contents within a specific place.

RELATED LITERATURES

Patent Literature

Korean Unexamined Patent Publication No. 10-2010-0081725

SUMMARY

The present disclosure is directed to dividing a physical place based on meanings and managing the divided physical places in order to clarify a range of contents to be provided to a user and easily control and manage virtual objects when authoring contents.

In one aspect, there is provided a system for authoring and providing augmented reality contents, which includes: a database storing a plurality of place models expressing an inherent physical place; a positioning unit for determining a current position of a user; a place model processing unit for searching and loading a place model corresponding to the current position of the user from the database; and a virtual object processing unit for disposing a virtual object expressed through a HTML document at a predetermined location in the loaded place model, wherein the plurality of place models is hierarchically stored so that at least one place model has at least one another place model of a subordinate concept.

In addition, in the system for providing augmented reality contents, in the case there is a plurality of place models corresponding to the position of the user, the place model processing unit may search and load a place model of a most-subordinate concept among the plurality of place models.

In addition, in the system for providing augmented reality contents, the positioning unit may determine a current position of the user by using another place model of a subordinate concept determined based on a point of the place model or at least one of relative position information of a virtual object and absolute position information of an inherent physical place corresponding to the place model.

In addition, in the system for providing augmented reality contents, when a place model for a specific event designated by a user is loaded, the virtual object processing unit may provide the place model for the specific event in which a virtual object is disposed to another device.

In addition, in the system for providing augmented reality contents, another device may be another display present out of the system or a display included in the system.

In addition, in the system for providing augmented reality contents, the database may further store virtual space media expressed as a three-dimensional place on a virtual space, respectively corresponding to the plurality of place models, and the virtual object processing unit may dispose the virtual object at a predetermined location of the virtual space media by using a style sheet, and if a place model corresponding to a predetermined virtual space media is loaded, the virtual object processing unit may scale the predetermined virtual space media based on the loaded place model.

In addition, the system for providing augmented reality contents may further include a user terminal, and the positioning unit may determine a current position of the user by using relative position information of a place model or a virtual object in an image provided by the user terminal.

In another aspect, there is provided a system for authoring and providing augmented reality contents, which includes: a database storing at least one place model expressing an inherent physical place and virtual space media respectively corresponding to the at least one place model; a positioning unit for determining a current position of a user; a place model processing unit for searching and loading a place model corresponding to the current position of the user from the database; and a virtual object processing unit for, when a place model for a specific event selected by the user is loaded, disposing a virtual object expressed through a HTML document at a predetermined location in the virtual space media corresponding to the loaded place model.

In addition, in the system for providing augmented reality contents, at least one place model may be hierarchically stored so that at least one place model has at least one another place model of a subordinate concept.

In addition, in the system for providing augmented reality contents, in the case there is a plurality of place models corresponding to the position of the user, the place model processing unit may search and load a place model of a most-subordinate concept among the plurality of place models.

In addition, in the system for providing augmented reality contents, the positioning unit may determine a current position of the user by using said another place model of a subordinate concept determined based on a point of the place model or at least one of relative position information of a virtual object and absolute position information of an inherent physical place corresponding to the place model.

In addition, in the system for providing augmented reality contents, when a place model for a specific event designated by a user is loaded, the virtual object processing unit may provide the place model for the specific event in which a virtual object is disposed to another device.

In addition, in the system for providing augmented reality contents, another device may be another display present out of the system or a display included in the system.

In addition, in the system for providing augmented reality contents, the virtual object processing unit may dispose the virtual object at a predetermined location of the virtual space media by using a style sheet, and if a place model corresponding to a predetermined virtual space media is loaded, the virtual object processing unit may scale the predetermined virtual space media based on the loaded place model.

In addition, the system for providing augmented reality contents may further include a user terminal, and the positioning unit may determine a current position of the user by using relative position information of a place model or a virtual object in an image provided by the user terminal.

Since a virtual object is augmented only for a single place where a user is located, unnecessary virtual objects are not loaded or controlled, thereby enhancing the computing efficiency and ensuring efficient selection.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION OF MAIN ELEMENTS

100: database
200: positioning unit
300: place model processing unit
400: virtual object processing unit
500: user terminal
1000: system for providing augmented reality contents

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. In the drawings, like reference numerals denote like elements. However, in the description, details of well-known features and techniques may be omitted to avoid unnecessarily obscuring the presented embodiments. In addition, the shape, size and regions, and the like, of the drawing may be exaggerated for clarity and may not mean the actual dimension.

The embodiments described in the specification may be implemented as hardware entirely, hardware partially and software partially, or software entirely. In the specification, the term "unit", "module", "device", "system" or the like indicates a computer-related entity like hardware, a combination of hardware and software, or software. For example, the term "unit", "module", "device", "system" or the like used in the specification may be a process, a processor, an object, an executable file, a thread of execution, a program, and/or a computer, without being limited thereto. For example, both a computer and an application executed in the computer may correspond to the term "unit", "module", "device", "system" or the like in the specification.

The embodiments have been described with reference to the flowchart shown in the figure. For brief explanation, the method has been illustrated and described as a series of blocks, but the present disclosure is not limited to the order of the blocks. In other words, some blocks may be executed simultaneously with other blocks or in a different order from those illustrated and described in this specification, and various diverges, flow paths, block sequences may also be implemented if they give the equivalent or similar results. In addition, in order to implement the method described in the specification, it is also possible not to demand all blocks. Further, the method for predicting a surgery stage may be implemented in the form of a computer program for executing a series of processes, and the computer program may also be recorded on a computer-readable recording medium.

Hereinafter, embodiments of the present disclosure will be described in detail with reference to the drawings.

The present disclosure hierarchically classifies a real space, defines each classified place as a separate meaningful place, and models detailed information for the separate place. A place model corresponding to each hierarchically classified real space is defined, and a virtual object is disposed based on the place model.

Figure 7:
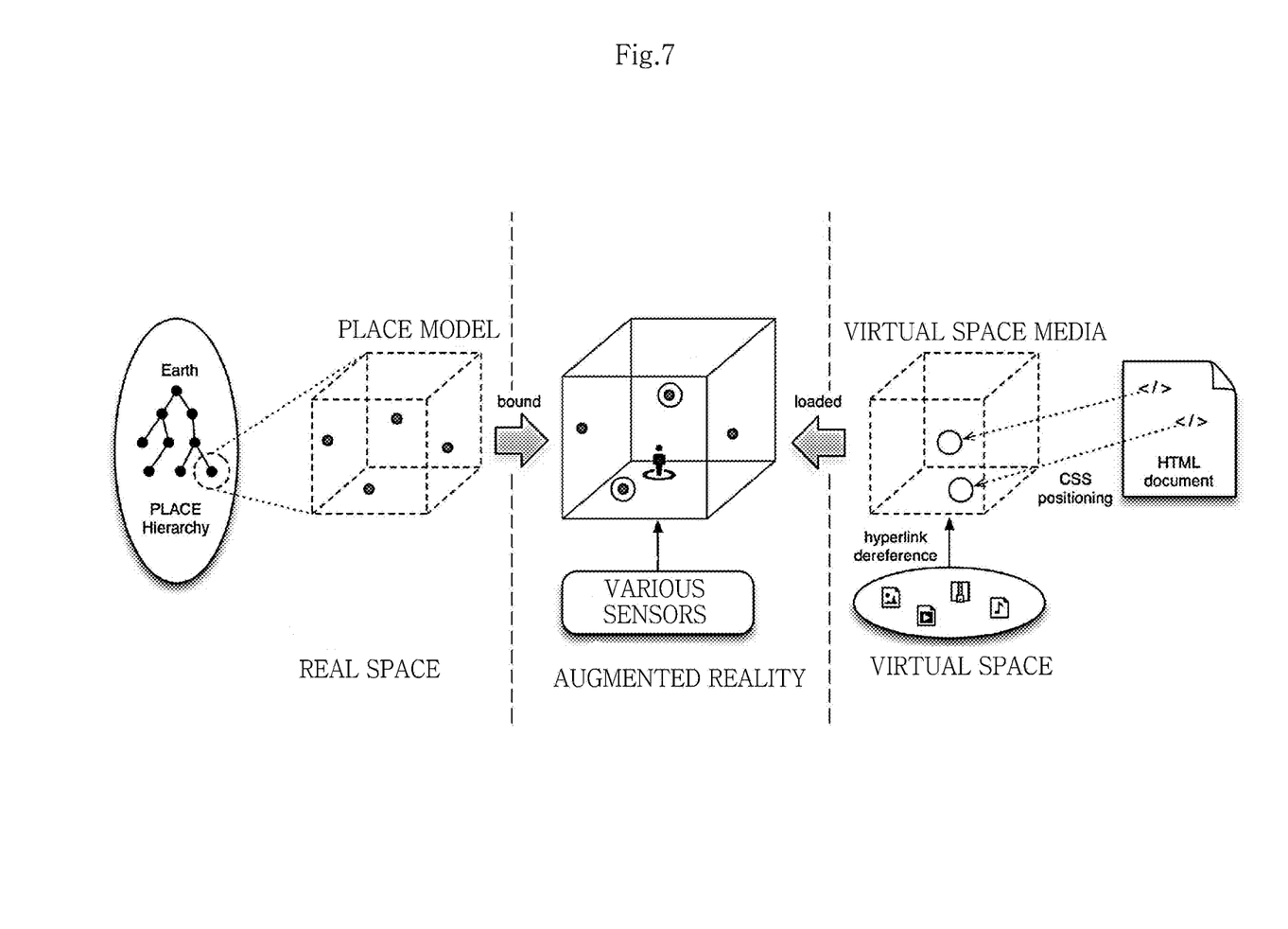
FIG. 7 is a diagram for illustrating a system for authoring augmented reality contents according to an embodiment of the present disclosure.

Referring to FIG. 7 first, a system for providing augmented reality contents according to an embodiment may define a place model expressing each meaningful physical place hierarchically classified with superior or subordinate concepts, and load a place model of a most-subordinate concept according to a position change of the user. In addition, in a virtual space, virtual objects generated to be disposed at predetermined locations of the place model through a HTML document may be exhibited in an augmented reality situation.

In a system for providing augmented reality contents according to another embodiment, at least one place model expressing a physical space may exist, and a virtual space media corresponding to each place model may be defined. The virtual space media is a three-dimensional virtual space, and an augmented reality content author may dispose a virtual object at the virtual space media through a HTML document. At this time, the virtual space media corresponds to a single place model.

Here, if a user executes a specific virtual space media and a place model corresponding to the executed virtual space media is loaded (for example, the user is present in a place corresponding to the virtual space media), in an augmented reality situation, the place model and the virtual space media may be matched, and the virtual objects may be provided to the user.

A system for providing augmented reality contents according to further another embodiment may provide a virtual object to a user by using a plurality of place models having a hierarchical structure as described above and a virtual space media of a virtual space in an augmented reality situation.

Such various embodiments of the system for providing augmented reality contents will be described in detail below.

Figure 1:
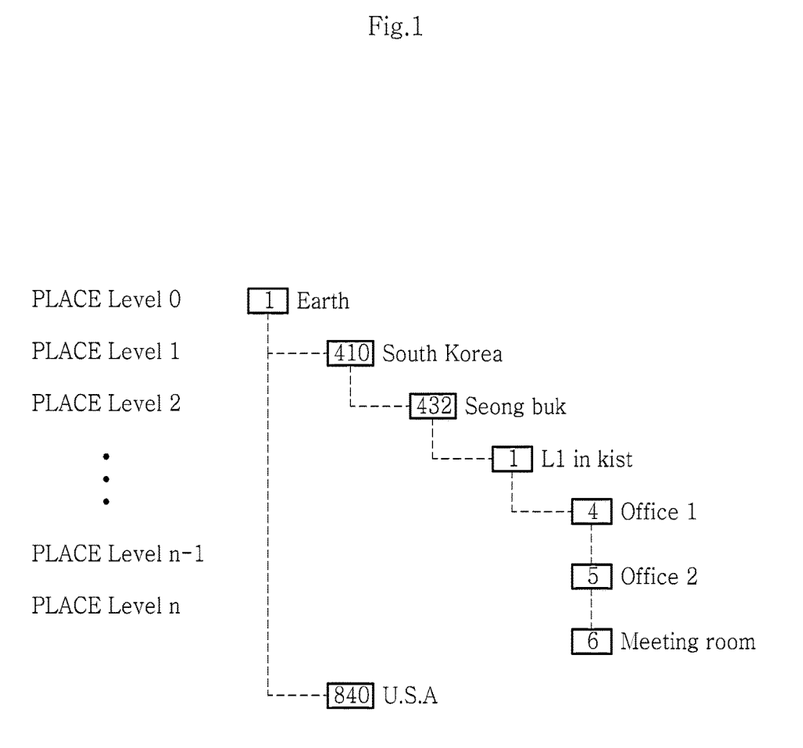
FIG. 1 is a diagram for illustrating a hierarchical place structure in an embodiment of the present disclosure.

FIG. 1 is a diagram for illustrating a hierarchical place structure in an embodiment of the present disclosure. In an embodiment of the present disclosure, a plurality of place models may be hierarchically structured and stored so that at least one place model has at least one another place model of a subordinate concept.

Referring to FIG. 1, every place is hierarchically systematized. The most superior level is the earth, and the next level is South Korea, USA or the like. In addition, a subordinate place of South Korea may be Seongbuk-gu, and Building L1 of the KIST is present in Seongbuk-gu. In more detail, Office 1, Office 2, a meeting room or the like are present in Building L1. In FIG. 1, a numeral depicted in the left portion of a space name exemplarily represents a reference symbol for distinguishing from another place in the same level. The structure depicted in FIG. 1 is just an example, and the present disclosure is not limited thereto.

For example, if the user is located out of Building L1, a physical place of the user in the real world is Seongbuk-gu, and Building L1 is recognized as a general physical object (Point of Interest (POI), in this specification, the POI may include an object or a location as a physical object). However, if the user enters Building L1, L1 is treated as a place, and Office 1 and Office 2 are treated as physical objects. In addition, in an embodiment, if the user is located out of Building L1, Office 1 and Office 2 may not be treated as a physical object.

Figure 2:
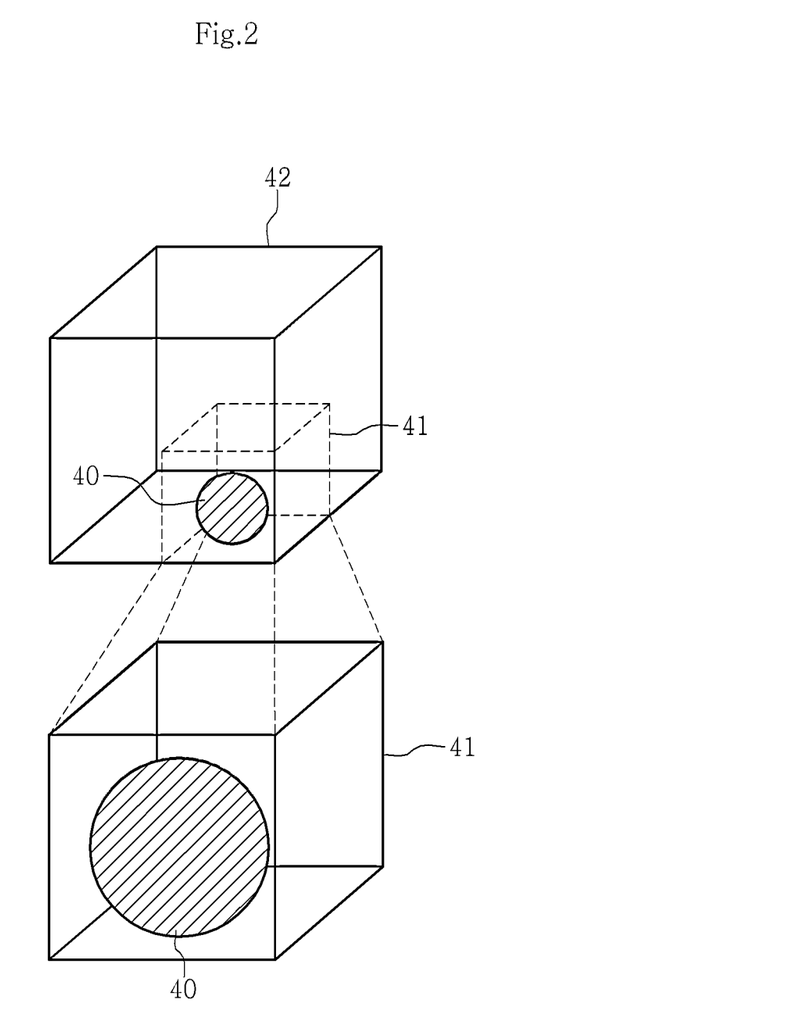
FIG. 2 is a diagram for distinguishing concepts of a physical object and a place in an embodiment of the present disclosure.

FIG. 2 is a diagram for describing concepts of a physical object and a place in an embodiment of the present disclosure. In FIG. 2, Place 42 includes Place 41. In other words, Place 42 is a superior concept of Place 41. In the example of FIG. 1, Place 42 may be Building L1, and Place 41 may be Office 1. If the user is located at Place 42, Place 41 is treated as a physical object. However, if the user enters Place 41, Place 41 is treated as a physical place, and physical object 40 is treated as an object. In other words, kinds of objects to be augmented at an augmented reality application are classified and distinguished according to a space to which the user belongs.

Figure 3:
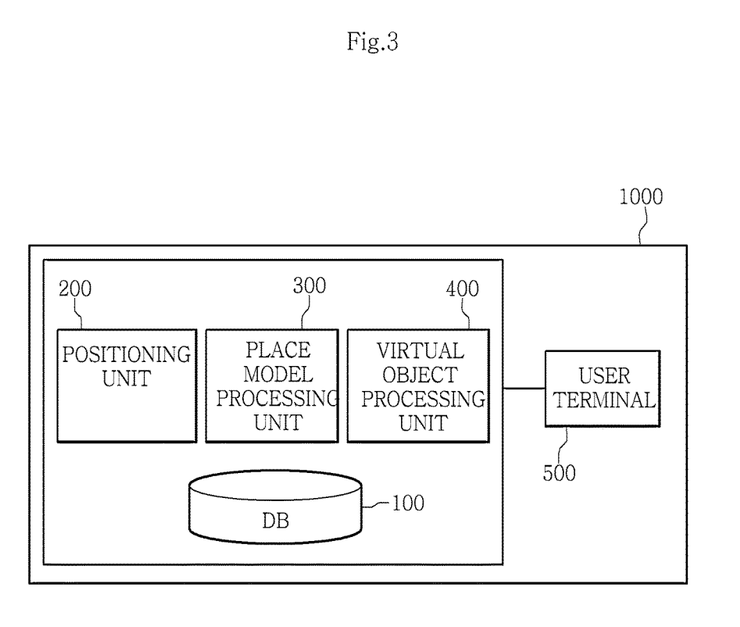
FIG. 3 is a diagram showing a system for providing augmented reality contents according to an embodiment of the present disclosure.

FIG. 3 is a diagram showing a system for providing augmented reality contents according to an embodiment of the present disclosure. Referring to FIG. 3, an augmented reality content providing apparatus 1000 may include a database (DB) 100, a positioning unit 200, a place model processing unit 300 and a virtual object processing unit 400.

The augmented reality content providing apparatus 1000 according to an embodiment of the present disclosure may include a mechanical device capable of generating a HTML document. In an embodiment, the HTML document may be an electronic document made by HTML5. The augmented reality content providing apparatus 1000 may generate program codes by user manipulation or instructions, and may be a terminal or server capable of transmitting or receiving various data via a communication network. For example, the system 1000 may be any one of a personal computer, a laptop, a table PC, a smart phone, a personal digital assistant (PDA), a smart TV and a mobile communication terminal, without being limited thereto.

In an embodiment, the database (DB) 100 stores a plurality of place models expressing an inherent physical place. Here, the plurality of place models may be hierarchically stored so that at least one place model has at least one another place model of a subordinate concept. In other words, as shown in FIG. 1, the plurality of place models may have superior or subordinate levels so that any place model may be included in another place model.

The place model is obtained by modeling a three-dimensional virtual space corresponding to an inherent physical place (namely, a place of the real world) and its dimension, shape and size may be arbitrarily determined as intended by a content author. For example, with reference to FIG. 1, a place model corresponding to Building L1, Office 1 and Office 2 of the real world may be modeled. In addition, each place model may be authored to have an inherent virtual object included in the corresponding place model.

Moreover, in another embodiment, the database may include at least one place model expressing an inherent physical place and virtual space media respectively corresponding to the at least one place model. In this case, the place models may not have a hierarchical structure. In addition, as described above, a virtual space media expressing a virtual three-dimensional space may include a virtual object disposed through a HTML document. The virtual space media corresponds to each place model, and an author may make an augmented reality content based on the virtual space media and apply the content to a place model.

Figure 4:
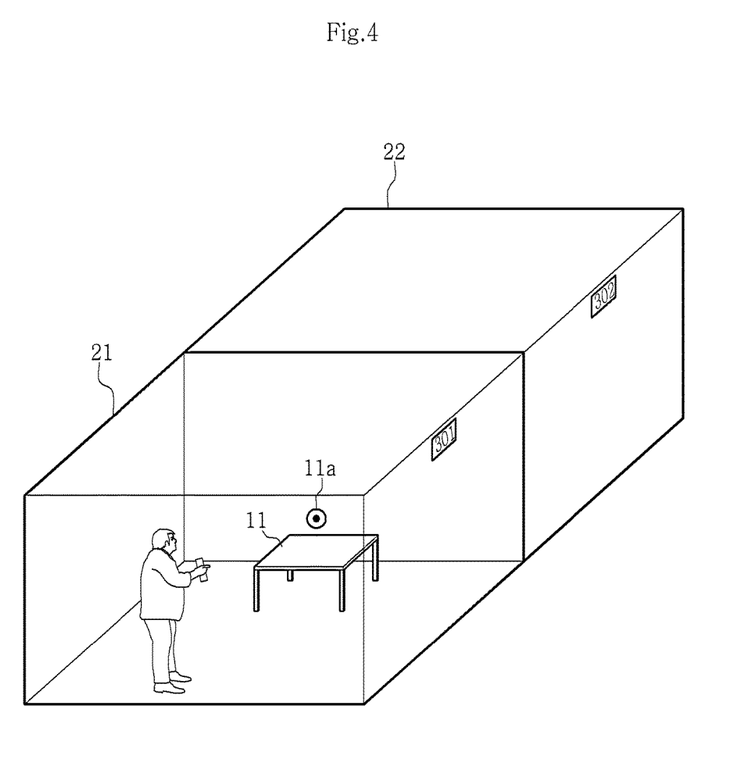
FIG. 4 is a diagram for illustrating an individual place model according to an embodiment of the present disclosure.

FIG. 4 is a diagram for illustrating an individual place mode 21 according to an embodiment of the present disclosure. For example, in FIG. 4, Room 301 and Room 302 are present in the real world. Room 301 may be modeled as place model 21 and Room 302 may be modeled as a separate place model 22. In addition, the author may author a virtual object 11a augmented on a table 11 which is present at Room 301.

For example, when the user is located in Room 301, the virtual object 11a is an object augmented on the table 11, and when the user is located in Room 302 or goes out of Room 301, the virtual object 11a is not augmented. Therefore, the virtual object 11a corresponds to an inherent virtual object corresponding to the place model 21.

In an embodiment, the database 100 may store virtual object information about disposition of an inherent virtual object present in each place model and position information of the real space corresponding to the place model.

The virtual object information includes information about a location where a virtual object is augmented (disposed) in the place model. The position where the virtual object is augmented may be designated according to the distance and direction information based on a specific point of the place model, or may be designated so as to be augmented on a specific physical object based on image recognition of a specific physical object present in the place model. In this case, the image recognition may be performed by means of image processing by extracting a feature point through a marker. In addition, the virtual object information may include information about location movement (translation), rotation, size adjustment or the like of the virtual object.

The database 100 may include position information of the real space corresponding to the place model. The position information may be an absolute coordinate value using GPS. In other case, if the real world place is a high-story building or an indoor space, the position information may be an absolute coordinate value, which is defined by using the RFID technique present in the building. An author may model the place model in consideration of the position information and a pattern of the real space.

In addition, the database 100 according to an embodiment of the present disclosure may store data about the virtual object information and the place model and position information in an XML film format or in a JSON-LD format.

The positioning unit 200 according to an embodiment of the present disclosure determines a current position of the user. In detail, the positioning unit 200 may determine a current position by recognizing a physical object (POI) in an image provided from the user terminal 500 or position information provided from a position sensor such as GPS. In order to recognize the physical object, a marker and image processing technique as described above may be used. In addition, in order to determine a current position, the position information may be used.

In another embodiment, the positioning unit 200 may determine a current position of the user by using the another place model of a subordinate concept determined based on a point of the place model or any one of relative position information of a virtual object and absolute position information of an inherent physical place corresponding to the place model.

For example, if the user is located between a place model of a subordinate concept and a place model of its superior concept, the place model of the subordinate concept may be defined and treated as a virtual object.

The positioning unit 200 may determine a position of the user by using relative position information between the user and each virtual object present in the place model and absolute position information obtained by a technique such as GPS and RFID. In order to obtain the relative position information, a position of the user in the place model may be accurately determined by utilizing position information of virtual objects in an image obtained from the user terminal or position information of specific POIs.

The place model processing unit 300 may search a place model corresponding to the current position of the user from the database and load the searched place model. In detail, the place model processing unit 300 loads a place model corresponding to the current position based on the position information and the place model data stored in the database 100 and the current position information of the user. The loaded place model is not instantly displayed on the display, but may be transferred to another device or used by the virtual object processing unit 400 included in the system to obtain coordinate information for displaying a virtual object according to the determination of the virtual object processing unit, if a specific condition is satisfied.

In an embodiment, if the user is located in a space of more subordinate concept, the number of searched place models may be greater. Therefore, the place model processing unit 300 may load only a most-subordinate place model among a plurality of searched place models.

In other words, if there is a plurality of place models corresponding to the current position of the user, the place model processing unit 300 may search and load a most-subordinate place model among the plurality of place models. Referring to FIG. 1, if the user is located in Office 1 , the user is located in Office 1 and also in other superior places, namely Building L1 and Seongbuk-gu. In this case, the place model processing unit 300 may load only a place model corresponding to Office 1 , which is a most-subordinate place model, among a plurality of place models.

In another embodiment, the place model processing unit 300 may search and load a place model corresponding to a current position by using a uniform resource identifier (URI) corresponding to the current position of the user. If the place model is authored by using a Hyper Text Markup Language (HTML) document, information about the place model may be used by means of URI. In this case, the user terminal may read the HTML document as a web page and display a place model corresponding to the current position on the display.

The place model processing unit 300 may also periodically check a current position of the user and dynamically load a three-dimensional place model corresponding to the current position. Therefore, a place model and virtual object suitable for a changing position of the user may be provided.

The virtual object processing unit 400 provides a virtual space media expressing the loaded three-dimensional place model to the user terminal or the display, and the virtual space media may express the inherent virtual object expressed through the HTML document on the loaded three-dimensional place model by using a style sheet. The virtual space media may be a web page or the like in which the three-dimensional place model is visually expressed.

The virtual object processing unit 400 may use a media type (for example, place media) in which a three-dimensional place is added to an existing CSS media type in order to display a place model including a virtual object. The virtual object processing unit 400 may be implemented with various three-dimensional engines such as WebGL, CSS 3D Transform or the like.

Figure 5A:
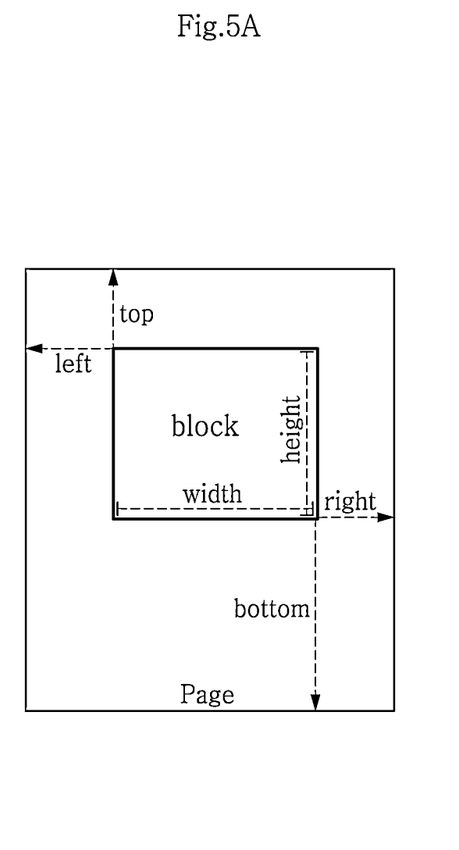
FIGS. 5A and 5B are diagrams for illustrating a layout of two-dimensional page and three-dimensional place.
Figure 5B:
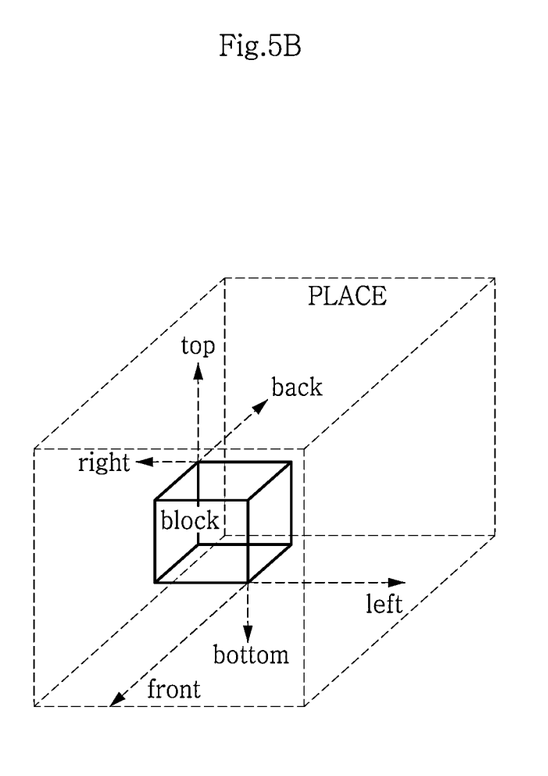

FIGS. 5A and 5B are diagrams for illustrating a layout of a two-dimensional page and a three-dimensional place. In the existing technique, multimedia is disposed and displayed on a two-dimensional planar page as shown in FIG. 5A. However, the augmented reality service is directed to augmenting a three-dimensional virtual object in relation to a three-dimensional real space, and needs a three-dimensional place model as shown in FIG. 5B. In the present disclosure, the place model may be defined basically as a hexahedron including upper, lower, right, left, front and rear sides. In addition, when a content author defines a place model by using a HTML document, the virtual object processing unit 400 may control size and state of the place model by defining properties as in Table 1 below.

TABLE 1

| Property | Description |
|---|---|
| boundary | Returns the boundary |
| crs | Returns the CRS object for the PLACE |
| targets | Returns an array of all the targets in the current document |
| height | Sets or returns the inner height of a PLACE's bbox area |
| width | Sets or returns the inner width of a PLACE's bbox area |
| depth | Sets or returns the inner depth of a PLACE's bbox area |
| map | Returns a map object |

The virtual object processing unit 400 may add a further DOM event type in order to process space movement. The DOM event type defines kinds and analysis methods of user inputs in an existing web, in which only inputs by a mouse or keyboard are defined. Recently, as smart phones are used more and more, a touch event or the like is being standardized. However, if the user moves into or out of a place model of a superior or subordinate concept, in order to display a HTML document in a space and process a virtual object and place model and a browsing event, it may be needed to define additional kinds of events. Therefore, in an embodiment, the virtual object processing unit 400 adds a location movement event so that the change of a place model where the user is located may be defined as an addition DOM event.

The place model processing unit 300 may periodically check a current of the user by using the result of the positioning unit 200, and continuously update a place model corresponding to the current position. Accordingly, the user may be provided with virtual objects which instantly change as a response to space movement.

In an embodiment, the virtual object processing unit 400 disposes an inherent virtual object included in the loaded place model at a predetermined location in the place model. In another embodiment, the virtual object processing unit 400 may also dispose an inherent virtual object at a predetermined location in the virtual space media corresponding to the loaded place model.

The virtual object processing unit 400 may augment a virtual object at a target point (a predetermined location of a target physical object or in the place model) and control location movement (translation), rotation, size adjustment or the like of the virtual object based on the virtual object information. The virtual objects are multimedia information, which may be pictures, photographs, flashes, moving pictures, music or the like.

In another embodiment, the positioning unit 200, the place model processing unit 300 and the virtual object processing unit 400 may be application codes used in the HTML document, and the user terminal 500 may read, render and display the HTML document by using a web browser. In addition, in another embodiment, the positioning unit 200, the place model processing unit 300 and the virtual object processing unit 400 may be modules such as processors, which are prepared to perform the following functions through a HTML document.

If a place model for a specific event designated by the user is loaded, the virtual object processing unit 400 may provide the place model for the specific event where a virtual object is disposed to another device. Here, the specific event designated by the user means a virtual space media which is performed when the user executes a HTML document by URI or the like. The executed virtual space media may be provided to and displayed at another device when a place model corresponding to the virtual space media is loaded. In other words, if a specific event occurs like a case where a user is located at a position designated by the user, the virtual space media and the place model may be fused with each other. In addition, another device is any device capable of visualizing a place model or virtual space media where a virtual object is disposed, and may be a display in the system or a display of another terminal out of the system. In other words, the system for providing augmented reality contents according to the present disclosure may be a user terminal or another server.

In another embodiment, if the database 100 further stores virtual space media expressed as a three-dimensional place in a virtual space respectively corresponding to the plurality of place models, the virtual object processing unit 400 may dispose the virtual object at a predetermined location of the virtual space media by using a style sheet, and if a place model corresponding to the predetermined virtual space media is loaded, the virtual object processing unit 400 may scale the predetermined virtual space media based on the loaded place model.

For example, the place model stored in the database and the virtual space media used for authoring augmented reality contents by the user may have different sizes, shapes, directions. In this case, the virtual object processing unit 400 may scale the virtual space media based on a place model more corresponding to the physical place.

In another embodiment, the augmented reality content providing apparatus 1000 may further include a user terminal 500, and the positioning unit 200 may determine a current position of the user by using relative position information of a place model or virtual object in an image provided from the user terminal 500. This has been described above in detail.

In an embodiment, the augmented reality content providing apparatus 1000 may include a program (for example, a developer tool) for generating such codes, a memory for storing protocols, a microprocessor for executing a corresponding application for operation and controlling, and a transmission unit for transmitting the HTML document to a target terminal, and may be a clouding computing terminal supporting cloud computing, which may generate the HTML document 10 through a communication terminal.

The user terminal may include a camera, a GPS sensor, a RFID recognition device, a tag, an acceleration sensor, a geomagnetic sensor or the like, and serves as a target for reading the HTML document and executing commands of the HTML document. The user terminal 500 may be a terminal capable of transmitting or receiving various data via a communication network, for example any one of, a table PC, a laptop, a personal computer, a smart phone, a personal digital assistant (PDA), and a mobile communication terminal, without being limited thereto.

The user terminal 500 may include an interpreter for reading a HTML document. For example, the user terminal 500 may read a HTML document by using a web browser operated by the user terminal 500 and execute codes by using a Java script interpreter loaded on the web browser.

Figure 6:
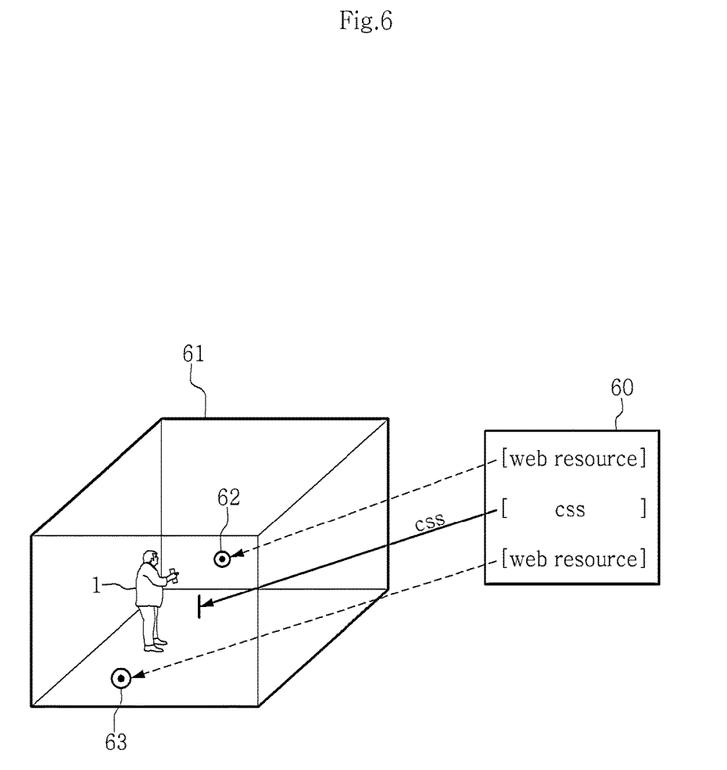
FIG. 6 is a diagram for illustrating a relation between a virtual object and a HTML document in a place model according to another embodiment of the present disclosure.

FIG. 6 is a diagram for illustrating a relation between a virtual object and a HTML document in a place model according to another embodiment of the present disclosure.

The HTML document 60 including the positioning unit 200, the place model processing unit 300 and the virtual object processing unit 400 may define a place model 61 and virtual objects 62, 63 augmented at the place model 61 by using web resources. The augmented reality content author may dispose and control a virtual object by determining a layout of place models whose borders are clear, which may enhance centrality of a subject when authoring augmented reality contents.

Though the present disclosure has been described with reference to the embodiments depicted in the drawings, it is just an example, and it should be understood by those skilled in the art that various modifications and equivalents can be made from the disclosure. However, such modifications should be regarded as being within the scope of the present disclosure. Therefore, the true scope of the present disclosure should be defined by the appended claims.

What is claimed is:

1. An apparatus to author and provide augmented reality content, comprising:
    a database configured to store place models;
    a positioner configured to determine a current position of a user;
    a place model processor configured to search and load the place models from the database, the place models comprising a first place model and a second place model that is hierarchically subordinate to the first place model; and
    a virtual object processor configured to
        select the second place model as a place model where a virtual object is augmented in a real space corresponding to the first place model, in response to determining that the user enters the real space corresponding to the first place model, and
        dispose the virtual object in the first place model using a media type in which a three-dimensional place is added to a CSS media type, wherein the virtual object is defined in an HTML document.

2. The apparatus according to claim 1,
wherein the place model processor is further configured to search and load a place model of a most-subordinate concept among the place models, in response to the database comprising place models corresponding to the current position of the user.

3. The apparatus according to claim 1,
wherein the positioner is further configured to determine the current position of the user using a place model of a subordinate concept determined based on a point of the place model or at least one of relative position information of a virtual object or absolute position information of a physical place corresponding to the place model.

4. The apparatus according to claim 1,
wherein the virtual object processor is further configured to provide a place model for a specific event designated by the user in which another virtual object is disposed to another device, in response to loading the another place model for the specific event.

5. The apparatus according to claim 4,
wherein the another device is an external display or an internal display.

6. The apparatus according to claim 1,
wherein the database is further configured to store virtual space media expressed as a three-dimensional place on a virtual space, respectively corresponding to the place models,
wherein the virtual object processor is further configured to dispose the virtual object at a location of the virtual space media using a style sheet, and
wherein the virtual object processor is further configured to scale the virtual space media according to dimensions of a real space occupied by the user and based on a loaded place model.

7. The apparatus according to claim 1, further comprising a user terminal,
wherein the positioner is further configured to determine the current position of the user using relative position information of a place model or a virtual object in an image provided by the user terminal.

8. The apparatus according to claim 1, wherein the database further comprises another virtual object that is hierarchically subordinate to the second place model, and wherein the virtual object processor is further configured to select the another virtual object to be augmented in a real space corresponding to the second place model, in response to determining that the user enters the real space corresponding to the second place model.

9. The apparatus according to claim 1, wherein the virtual object processor is further configured to discontinue augmenting the virtual object in the real space corresponding to the first place model, in response to determining that the user exits the real space corresponding to the first place model.

10. An apparatus to author and provide augmented reality content, comprising:
    a database configured to store place models and virtual space media respectively corresponding to the place models;
    a positioner configured to determine a current position of a user in real space;
    a place model processor configured to search and load the place models from the database, wherein the place models comprise a first place model and a second place model that is hierarchically subordinate to the first place model; and
    a virtual object processor configured to
        select the second place model as a place model where a virtual object is augmented in a real space corresponding to the first place model, in response to determining that the user enters the real space corresponding to the first place model, and
        dispose the virtual object using a media type in which a three-dimensional place is added to a CSS media type, at a location in the virtual space media corresponding to the first place model, in response to an event being selected by the user, wherein the virtual object is defined in an HTML document.

11. The apparatus according to claim 10,
wherein the place models are hierarchically stored.

12. The apparatus according to claim 10,
wherein the place model processor is further configured to search and load a place model of a most-subordinate concept among the place models, in response to a place models corresponding to the position of the user.

13. The apparatus according to claim 10,
wherein the positioner is further configured to determine the current position of the user using a place model of a subordinate concept determined based on a point of the place model or at least one of relative position information of a virtual object or absolute position information of a physical place corresponding to the place model.

14. The apparatus according to claim 10,
wherein the virtual object processor is further configured to provide the place model for a specific event designated by the user in which another virtual object is disposed to another device, in response to loading the another place model for the specific event.

15. The apparatus according to claim 14,
wherein the another device comprises another display located outside of the apparatus or a display included in the apparatus.

16. The apparatus according to claim 10,
wherein the virtual object processor is further configured to dispose the virtual object at a location of the virtual space media using a style sheet; and
wherein the virtual object processor is further configured to scale the virtual space media according to dimensions of a real space occupied by the user and based on a loaded place model.

17. The apparatus according to claim 10, further comprising a user terminal,
wherein the positioner is further configured to determine the current position of the user using relative position information of a place model or a virtual object in an image provided by the user terminal.

* * * * *